US008483396B2

(12) United States Patent
Amadu et al.

(10) Patent No.: US 8,483,396 B2
(45) Date of Patent: Jul. 9, 2013

(54) METHOD FOR THE SOUND PROCESSING OF A STEREOPHONIC SIGNAL INSIDE A MOTOR VEHICLE AND MOTOR VEHICLE IMPLEMENTING SAID METHOD

(75) Inventors: Frederic Amadu, Chelles (FR); Yann Lecoeur, La Valette du Var (FR)

(73) Assignee: Arkamys, Paris (FR)

( * ) Notice: Subject to any disclaimer, the term of this patent is extended or adjusted under 35 U.S.C. 154(b) by 643 days.

(21) Appl. No.: 12/667,828

(22) PCT Filed: Jun. 25, 2008

(86) PCT No.: PCT/FR2008/051164
§ 371 (c)(1),
(2), (4) Date: May 5, 2010

(87) PCT Pub. No.: WO2009/004268
PCT Pub. Date: Jan. 8, 2009

(65) Prior Publication Data

US 2010/0208900 A1 Aug. 19, 2010

(30) Foreign Application Priority Data

Jul. 5, 2007 (FR) .................................... 07 56279

(51) Int. Cl.
*H04R 5/00* (2006.01)
*H04R 5/02* (2006.01)
*H04B 1/00* (2006.01)

(52) U.S. Cl.
USPC .................... 381/17; 381/1; 381/86; 381/302

(58) Field of Classification Search
USPC ................. 381/1, 17, 86, 302, 18, 19, 59, 89, 381/91, 96–98
See application file for complete search history.

(56) References Cited

U.S. PATENT DOCUMENTS

| | | | | |
|---|---|---|---|---|
| 4,769,843 | A | 9/1988 | Imai et al. | |
| 5,305,386 | A * | 4/1994 | Yamato | 381/1 |
| 5,910,904 | A | 6/1999 | Uramoto | |
| 6,477,255 | B1 * | 11/2002 | Yoshida et al. | 381/86 |
| 6,928,172 | B2 * | 8/2005 | Ohta | 381/98 |
| 7,058,187 | B2 * | 6/2006 | Ohta | 381/98 |
| 7,466,828 | B2 * | 12/2008 | Ito | 381/86 |
| 7,933,421 | B2 * | 4/2011 | Asada | 381/302 |
| 2005/0008170 | A1 * | 1/2005 | Pfaffinger et al. | 381/96 |
| 2008/0049948 | A1 * | 2/2008 | Christoph et al. | 381/86 |

FOREIGN PATENT DOCUMENTS

| | | | |
|---|---|---|---|
| EP | 1475996 | A1 | 11/2004 |
| FR | 2865096 | A1 | 7/2005 |
| WO | WO-2006/125931 | A1 | 11/2006 |

* cited by examiner

*Primary Examiner* — Mohammad Islam
*Assistant Examiner* — David Ton
(74) *Attorney, Agent, or Firm* — IM IP Law PLLC; C. Andrew Im

(57) ABSTRACT

The invention relates to a method for the sound processing of a stereophonic signal inside a motor vehicle. In a first implementation ("driver" mode) the stereophonic sound source is centered in the middle of the dashboard for the 'driver' listen position. For this purpose, delays (t1-t4) are introduced into the frequency bands of the channels transmitted by the speakers, such that the driver appears to be at the center of a circle on which the car speakers are positioned. In a second implementation ("all passengers" mode), the phases of the signals of the two front channels are equalized, such that the sound source appears to be centered on the driver and the front passenger of the vehicle.

21 Claims, 5 Drawing Sheets

METHOD FOR THE SOUND PROCESSING OF A STEREOPHONIC SIGNAL INSIDE A MOTOR VEHICLE AND MOTOR VEHICLE IMPLEMENTING SAID METHOD

RELATED APPLICATIONS

This application is a §371 application from PCT/FR2008/051164 filed Jun. 25, 2008, which claims priority from French Patent Application No. 07 56279 filed Jul. 5, 2007, each of which is herein incorporated by reference in its entirety.

TECHNICAL FIELD OF THE INVENTION

The invention relates to a method for the sound processing of a stereophonic signal delivered inside a motor vehicle and a motor vehicle implementing this method. In particular, the object of the invention is to increase the listening quality of an audio track inside a vehicle. This audio track may contain, for example, a telephone conversation and/or music.

The invention is particularly advantageous when applied to sound processing methods implemented with audio systems having two input channels and four, five, or six output channels.

BACKGROUND OF THE INVENTION

In cars, the stereo signal, composed of a left sound signal ($1^{st}$ channel) and a right sound signal ($2^{nd}$ channel) generated by a stereophonic source (such as a car radio), is delivered through 4 channels.

Two channels (the front left and right channels) are delivered by the front transducers of the vehicle, while two other channels (the rear left and right channels) are delivered by the rear transducers. A fifth channel can also be generated and delivered by a transducer located in the center of the dashboard.

In the application, a transducer means a system that transforms an electric sound signal into an acoustic sound signal.

In general, a transducer connected to a given channel includes two speakers, which respectively deliver the high frequency part and the low frequency part of the electric sound signal transported by the channel.

Thus, a first speaker called a "tweeter" delivers the high frequency part of the channel signal, while a second speaker called a "woofer" delivers the low frequency part of the channel signal.

In a known way, certain transducers may be positioned so that the sound seems to come from the bottom of the vehicle, which does not provide a very pleasant listening experience for the passengers.

The invention makes it possible to solve this problem by positioning the sound image in the plane of each passenger's ears, in front of each passenger and/or in the middle of the dashboard of the vehicle.

OBJECT AND SUMMARY OF THE INVENTION

Thus, the object of the invention is to minimize the phase opposition effects between the left and right signals received at the location of at least one passenger's head.

In a first embodiment of the invention, called the "driver" mode, the stereophonic sound source is centered in the middle of the dashboard for the "driver" listening position. Thus, delays are introduced in the frequency bands of each speaker so that all of the speakers seem to be at the same distance as the one furthest from the driver.

In a second embodiment, called the "all passengers" mode, the resulting phase of the front channel signals and the phase of the rear channel signals perceived by the listeners are equalized so that the sound source seems to be centered in front of each passenger. Moreover, in this mode, delays are introduced in the front channel signals so as to time-align the "tweeter/woofer" pairs.

Thus, the invention relates to a method for the sound processing of a stereophonic signal inside a motor vehicle, the stereophonic signal being composed of a left electric sound signal and a right electric sound signal, wherein

- the phase of these electric sound signals is equalized so as to minimize the phase opposition effects in frequency bands of these left and right signals received at approximately the location of one passenger's head, and
- the phase-equalized left electric sound signal and the phase-equalized right electric sound signal are respectively delivered by means of a front left transducer positioned in the front left part of the vehicle and a front right transducer positioned in the front right part of the vehicle.

According to one embodiment, in order to minimize the phase oppositions, filters are applied to the left electric sound signal and/or to the right electric sound signal so that the phase difference curve between the left and right electric sound signals received at the location of the passenger's head bypasses the points at which the left and right electric sound signals are in phase opposition.

According to one embodiment, in order to minimize the phase opposition effects, all-pass filters are applied to the left or right signal, these all-pass filters each having a cutoff frequency substantially equal to a middle frequency of the frequency band for which the left and right electric sound signals received are in phase opposition.

According to one embodiment, in order to minimize the phase opposition effects, pairs of all-pass filters are applied, one of the filters in the pair being applied to the left electric sound signal and the other filter in the pair being applied to the right electric sound signal, the filters in a pair having cutoff frequencies that surround a middle frequency of the frequency band for which the left and right electric sound signals received are in phase opposition.

According to one embodiment, the all-pass filters are Infinite Impulse Response (IIR) type filters.

According to one embodiment, the filters are Finite Impulse Response (FIR) type filters, these filters each having a phase response, each having the curve of an inverted gate having a value of −180 degrees in a frequency band in which the signals received are in phase opposition.

According to one embodiment, the electric sound signals received are considered to be in phase opposition when the phase difference between these signals is equal to 180 degrees plus or minus 20 degrees modulo 360 degrees.

According to one embodiment, the phase opposition effects are minimized for a frequency band of between 20 hz and 2 kHz.

According to one embodiment, the frequency spectrum of the left and right electric sound signals is equalized so as to compensate for the acoustics in the front of the vehicle, by means of a spectrum correction module.

According to one embodiment, frequency bands of each electric sound signal are filtered, and delays are introduced in these frequency bands. The delays are chosen so as to time-align the speakers of the front left transducer and the speakers of the front right transducer delivering these frequency bands.

According to one embodiment, the low frequency part and the high frequency part of each electric sound signal are filtered, the delays being chosen so as to time-align the speakers respectively delivering the low and high frequency parts of the left electric sound signal, the delays being chosen so as to time-align the speakers respectively delivering the low and high frequency parts of the right electric sound signal.

According to one embodiment, the left and right delays applied to the high frequency speakers are identical, and the left and right delays applied to the low frequency speakers are identical, due to the geometry of the vehicle. However, in a variant, they could be different.

According to one embodiment, the frequency bands of the speakers correspond to the frequency bands of the filtered signals they deliver.

According to one embodiment, the frequency bands of the left electric sound signal are combined into a reconstructed left electric sound signal, this reconstructed left electric sound signal being delivered by the front left transducer. While the frequency bands of the right electric sound signal are combined into a reconstructed right electric sound signal, this reconstructed right electric sound signal being delivered by the front right transducer.

According to one embodiment, the frequency bands of the electric sound signals are volume-adjusted by gain cells.

According to one embodiment, a central electric sound signal is generated from the in-phase spectral components of left and right electric sound signals originating from a stereophonic source, this central electric sound signal being delivered, after the introduction of a delay and an adjustment of the level and volume, by a transducer positioned in the center of the dashboard.

According to one embodiment, the left electric sound signal and the right electric sound signal are obtained by subtracting the spectral components of the central electric sound signal from those of the original left electric sound signal and from those of the original right electric sound signal, respectively.

According to one embodiment, rear left and right electric sound signals are generated from substantially out-of-phase components of the left and right electric sound signals, these signals being delivered, after the introduction of a delay and an adjustment of the level and volume, by a rear left transducer and a rear right transducer, respectively.

The invention also relates to a method for the sound processing of a stereophonic signal inside a motor vehicle, the stereophonic signal being composed of a left electric sound signal and a right electric sound signal, wherein frequency bands of each electric sound signal are filtered, and delays are introduced in these frequency bands.

The delays are chosen so that the transducers delivering these frequency bands are virtually disposed on a circle, this circle having as its center the place where the driver is located and having a radius equal to the distance that separates the driver from the transducer furthest from the driver.

According to one embodiment, the low frequency part and the high frequency part of each electric sound signal are filtered, the transducers each comprising a low frequency speaker and a high frequency speaker, the delays being chosen so as to time-align the speakers respectively delivering the low and high frequency parts of the left electric sound signal.

The delays are chosen so as to time-align the speakers respectively delivering the low and high frequency parts of the right electric sound signal. The left and right delays applied to the high frequency speakers are identical, and the left and right delays applied to the low frequency speakers are identical.

The invention also relates to a motor vehicle comprising a sound source generating a stereo signal inside a car, this stereo signal being composed of a left electric sound signal and a right electric sound signal, these left and right electric sound signals being processed by the method according to the invention so as to be respectively delivered by a front left transducer comprising only one speaker and a front right transducer comprising only one speaker.

According to one embodiment, the front left and right speakers are wide-band speakers.

BRIEF DESCRIPTION OF THE DRAWINGS

The invention will be better understood by reading the following description and examining the accompanying figures These figures are given merely as examples and do not in any way limit the invention. They show.

DETAILED DESCRIPTION OF THE EMBODIMENTS

The same elements retain the same references from one figure to another.

Figure 1:
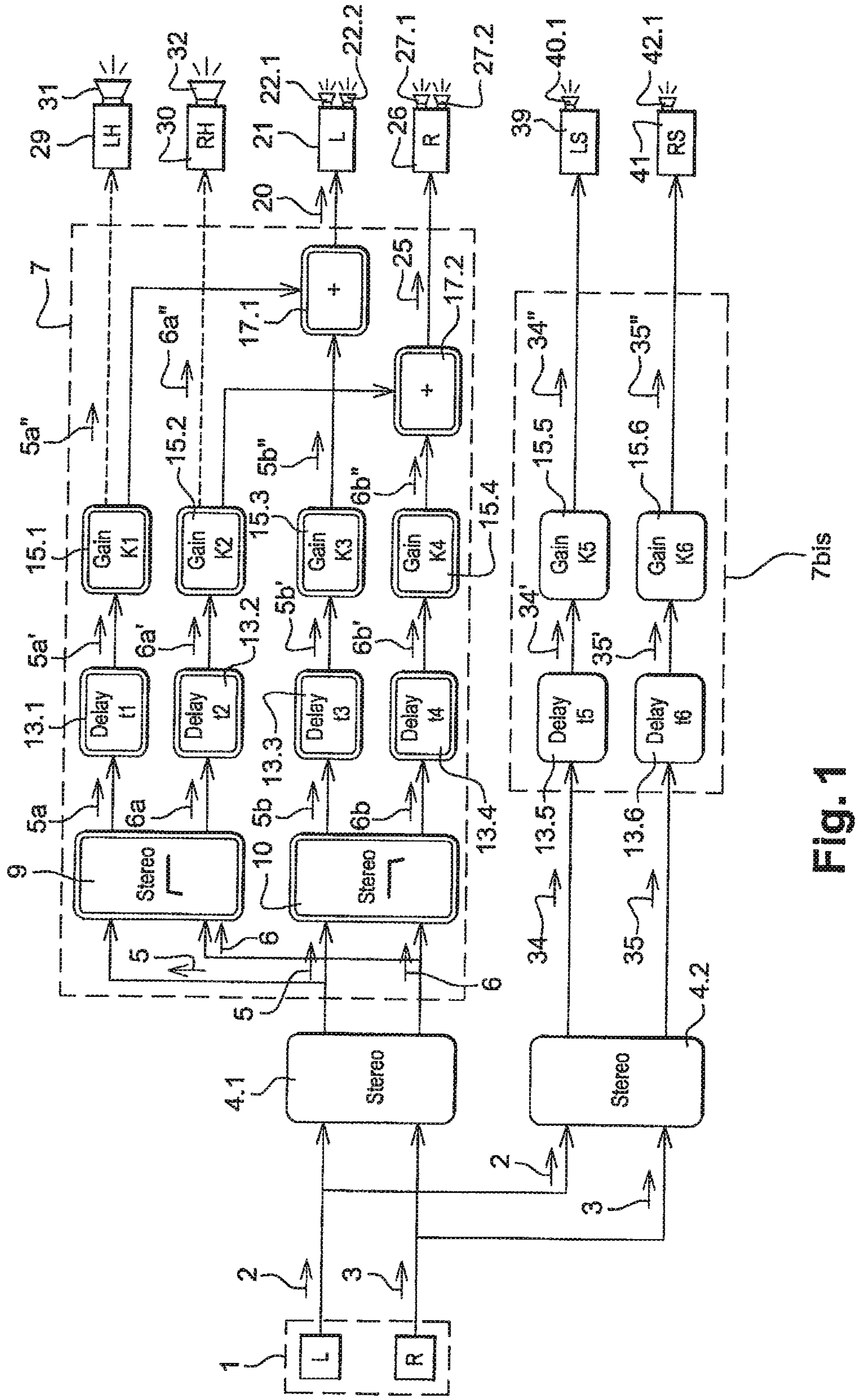
FIG. 1: a schematic functional representation of an audio system implementing the “driver” mode according to the invention.

FIG. 1 shows a schematic functional representation of an audio system implementing the “driver” mode, which makes it possible to position the center of the sound image for a listening position in the driver’s seat of the vehicle.

The audio system according to the invention has two input channels 2 and 3 and four output channels 20, 25, 34" and 35", respectively delivered by the transducers 21, 26, 39, 41.

More precisely, a sound source 1, such as a CD player, generates a stereo signal composed of a left electric sound signal 2 and a right electric sound signal 3 (2 input channels).

These signals 2 and 3 are applied as input to a module 4.1 for correcting the sound level spectrum. This module 4.1 equalizes the spectrum of the signals 2 and 3.

For this purpose, the module 4.1 comprises a filter for smoothing the perceived spectral response of the electric sound signals 2 and 3 so that all of the frequencies emitted at a given power tend to be perceived by the driver at the same level of amplitude.

In one embodiment, in order to calculate the coefficients of the filter of the module 4.1, for example “peak/notch” type filters, a known signal is delivered via the front left and right transducers 21, 26 and the signal is recorded at the location of the driver's head by means of a microphone. From this is deduced a transfer function called the "vehicle transfer function," and using the inverse transfer function of the "vehicle transfer function," the coefficients of the filter are parameterized in so that the defects in the spectrum of the recorded signal are compensated in such a way as to reconstruct the spectrum of the initial signal.

This module 4.1 thus creates a spectral shape that compensates for the acoustics of the vehicle so that the sound signals delivered in the front of the vehicle by the transducers 21, 26 and perceived by the driver (after the passage of the sound signals into the vehicle) have a spectrum as close as possible to that of the original sound signal.

An equalized left electric sound signal 5 and an equalized right electric sound signal 6 are obtained as output from the module 4.1. These signals 5 and 6 are applied as input to a block 7 for spatially correcting the signals 5 and 6.

More precisely, these signals 5 and 6 are respectively applied as input to a high pass type filter 9 and a low pass type filter 10. A left high frequency electric sound signal 5*a* and a right high frequency electric sound signal 6*a* are obtained as output from the filter 9. A left low frequency electric sound signal 5*b* and a right low frequency electric sound signal 6*b* are obtained as output from the filter 10.

The cutoff frequencies of the filters 9 and 10 correspond to the cutoff frequencies of the speakers used to deliver the filtered signals. In one embodiment, these cutoff frequencies are substantially identical. In other words, the frequency bands of the filtered signals correspond to the frequency bands of the speakers delivering these filtered signals.

In this case, two speakers 22.1, 22.2 and 27.1, 27.2 are connected to each channel in order to respectively deliver the high frequency bands and the low frequency bands. In a variant, for a vehicle comprising 3 speakers per channel, respectively delivering a high, middle and low frequency sound signal, the left and right electric sound signals are each respectively filtered by 3 filters, each of which corresponds to one of the frequency bands of these 3 speakers (high, middle or low).

The signals 5*a*, 5*b* and 6*a*, 6*b* are then each applied as input to a delay cell 13.1-13.4. The delays t1-t4 introduced are set as a function of the positioning of the speakers in the car, particularly as a function of the distance between them and the driver.

Figure 4:
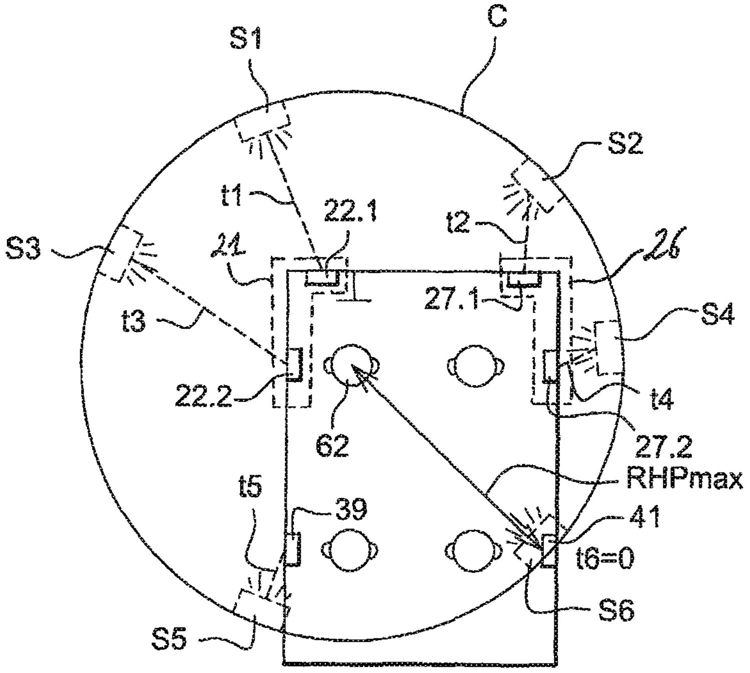
FIGS. 4-5: schematic representations of the virtual location of the center of the sound image when the method according to the invention is implemented in “driver” mode and when the method according to the invention is implemented in “all passengers” mode, respectively.

More precisely, delays t1-t4 are introduced in the signals 5*a*, 5*b* and 6*a*, 6*b* so that all of the front speakers seem to be located at the same distance RHPmax as the transducer 41 furthest from the head of the driver 62 (see FIG. 4).

Thus, the frequency band intended to be delivered by the furthest speaker is not delayed, while the frequency bands delivered by the speakers closer to the driver's head are delayed by a delay such that the sound delivered by these closer speakers seems to be perceived at the level of the driver's head at the same time as the signal from the furthest speaker furthest is perceived. In other words, the frequency bands are delayed in such a way that the sounds delivered by all of the speakers are perceived at the same time at the location of the driver's head.

The driver 62 is thus located in the center of a circle C of radius RHPmax on which the images S1-S4 from the speakers 22.1, 22.2, 27.1, 27.2 are located, as illustrated in FIG. 4.

In practice, the distance that separates each speaker from the driver is first measured and as a function of this measurement, a delay is introduced in the frequency bands delivered by the speakers other than the one that is furthest away, so that all of the speakers seem to be located at the distance RHPmax of the furthest speaker.

In the driver mode, placing all of the transducers the same distance away from the driver (at least one of the passengers) completely cancels out the phase opposition effects, which are not very pleasant to the ear.

The delayed signals 5*a*', 6*a*', 6*b*' and 6*b*' observable as output from the cells 13.1-13.4 are applied as input to gain cells 15.1-15.4. These cells 15.1-15.4 adjust the volume of the high and low frequency sound signals. To do this, the delayed signals are multiplied by coefficients K1-K4, for example between 0 and 1.

The processed left high-frequency electric sound signal 5*a*" observable as output from the cell 15.1 and the processed left low frequency electric sound signal 5*b*" observable as output from the cell 15.3 are applied as input to an adder 17.1.

A reconstructed left electric sound signal 20 is then observable as output from this adder 17.1. This signal 20 corresponds to the front left channel (first output channel) delivered by a transducer 21 comprising two speakers 22.1 and 22.2 positioned in the front left part of the vehicle.

The first speaker 22.1 (the "tweeter") delivers the high frequency part of the signal 20, while the second speaker 22.2 ("the woofer") delivers the low frequency part of the signal 20.

Likewise, the processed right high frequency electric sound signal 6*a*" observable as output from the cell 15.2, and the processed right low frequency electric sound signal 6*b*" observable as output from the cell 15.4 are applied as input to an adder 17.2.

A reconstructed left electric sound signal 25 is then observable as output from this adder 17.2. This signal 25 corresponds to the front right channel (second output channel) delivered by a transducer 26 comprising two speakers 27.1 and 27.2 positioned in the front right part of the vehicle.

The first speaker 27.1 (the "tweeter") delivers the high frequency part of the signal 25, while the second speaker 27.2 ("the woofer") delivers the low frequency part of the signal 25.

The high frequency and low frequency parts of the signals 20 and 25 delivered by the speakers 22.1, 22.2 and 27.1, 27.2 correspond, as seen above, to the frequency bands filtered by the high frequency and low frequency filters 9 and 10.

In a variant, the high frequency electric sound signals 5*a*" and 6*a*" are respectively delivered by a transducer 29 and 30 comprising only one speaker 31, 32 having a high frequency band. While the transducers 21 and 26 directly deliver the signals 5*b*" and 6*b*". Thus, there is one speaker per channel, not two speakers per channel. In this case, the adders 17.1 and 17.2 are eliminated.

Furthermore, the signals 2 and 3 are applied as input to a second module 4.2 for correcting the level spectrum. Like the module 4.1 for the front channels 20, 25 of the vehicle, this module 4.2 compensates for the acoustics of the vehicle for the rear channels 34", 35" of the vehicle. Equalized left and right electric sound signals 34, 35 are observable as output from the module 4.2.

These signals 34 and 35 are applied as input to a second block 7*b* is for the spatial correction of the signals 34 and 35.

More precisely, these signals 34 and 35 (the third and fourth output channels) are respectively applied as input to the delay cells 13.5 and 13.6. These cells 13.5, 13.6 each introduce a delay t5 and t6 in the signals 34 and 35 so that all of the transducers seem to be virtually at the distance RHPmax of the speaker furthest from the driver, as illustrated by FIG. 4.

The signals 34' and 35' observable as output from the delay cells are applied as input to a gain cell 15.5, 15.6, which adjusts the volume of the signals 34', 35' by multiplying them by a gain K5, K6.

The processed electric sound signals 34" and 35" observable as output from the cells 15.5 and 15.6 are respectively applied as input to a rear transducer 39 and 41 in order to be delivered.

The transducers 39 and 41 each comprise a speaker 40.1 and 42.1 for delivering the signals 34", 35", respectively.

In a variant, the rear transducers 39, 41 comprise several speakers.

In a variant, the system has only two front channels transporting the signals 20, 25, and no rear channel transporting the signals 34", 35".

In a variant, the spectrum correction modules 4.1 and 4.2 are not used, the signals 2 and 3 in that case being directly applied as input to the block 7 and the cells 13.5, 13.6.

Figure 2:
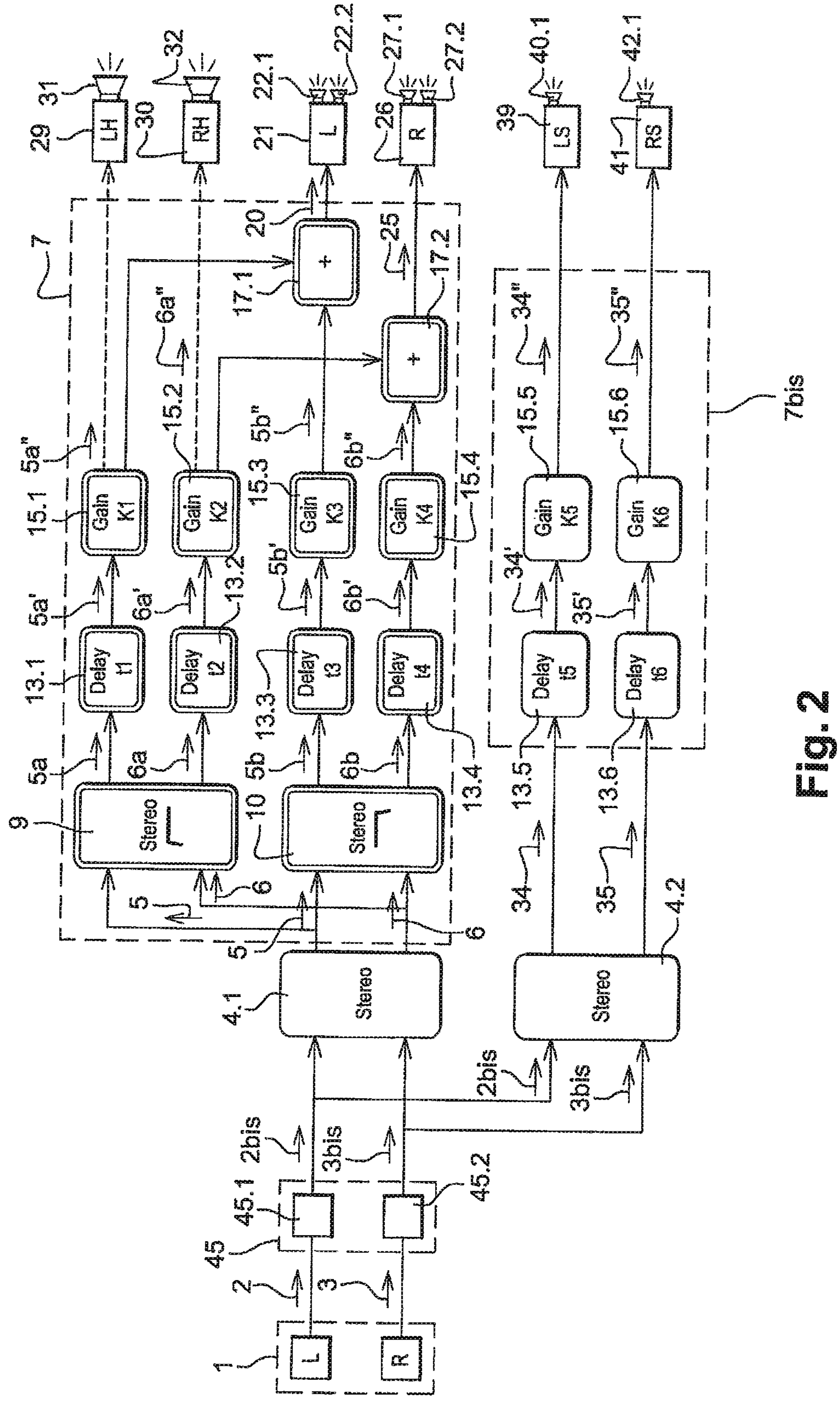
FIG. 2: a schematic functional representation of an audio system implementing the “all passengers” mode according to the invention.

In the "all passengers" embodiment of FIG. 2, before being applied as input to the modules 4.1 and 4.2, the signals 2 and 3 are applied as input to a phase equalization module 45. Phase-equalized left and right electric sound signals 2*bis* and 3*bis* are obtained as output from the module 45. These signals 2*bis* and 3*bis* are then processed by the blocks 4.1 and 7 prior to being delivered by the front transducers 21 and 26 and processed by the blocks 4.2 and 7*bis* prior to being delivered by the rear transducers 39 and 41.

For this purpose, the module 45 comprises a filter that corrects the phase defects perceived by the passengers. In one embodiment, in order to calculate the coefficients of the filter of the module 45, a known signal whose phase response is zero is delivered by means of front left and right transducers 21, 26 positioned non-symmetrically relative to a passenger, for example the driver. In fact, the distance from one of the transducers 21, 26 to the passenger's head is different than the distance from the other transducer 21, 26 to the passengers head.

The signal emitted from the left channel via the transducer 21 is recorded by means of a microphone at the location of one passenger's head, and from this is deduced the phase response $\phi L$ of the received left channel signal indicating the variation in the phase of the received left signal as a function of the frequency.

Likewise, the signal emitted from the right channel via the transducer 26 is recorded by means of the microphone at the location of one passenger's head, and from this is deduced the phase response $\phi R$ of the received right channel signal indicating the variation in the phase of the received right signal as a function of the frequency.

The phase responses $\phi L$ and $\phi R$ are for example calculated from the Fourier transform of the signal received.

Figure 6:
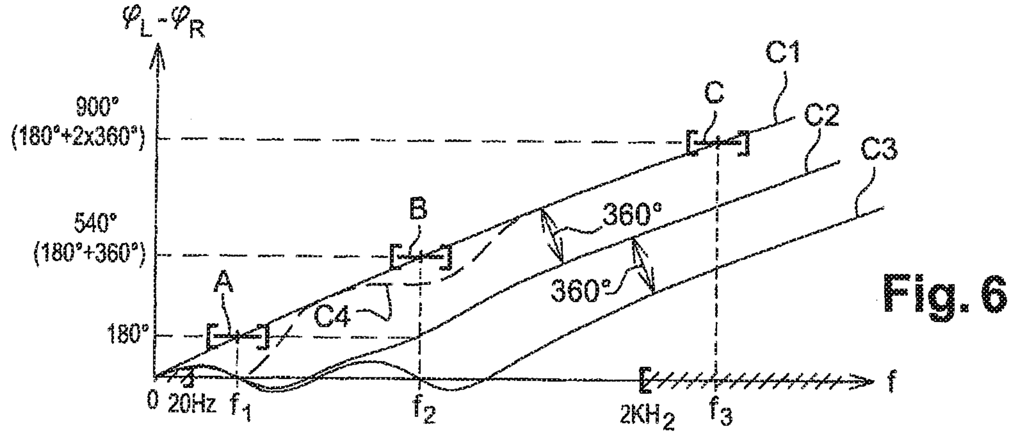
FIG. 6: a graphical representation of the phase difference between the front left and right signals received at the location of one passenger’s head, before and after phase correction.
Figure 7:
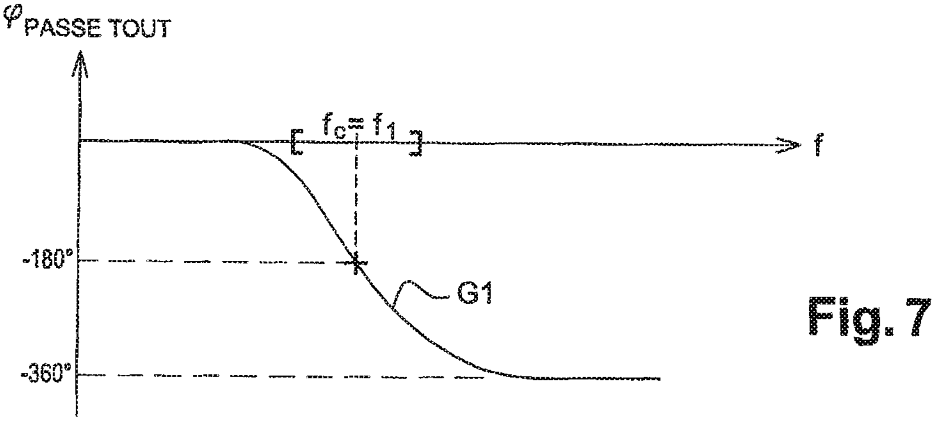
FIG. 7: a graphical representation of a phase response of an “all pass” filter used to minimize the phase opposition between the acoustic signals received at the location of one passenger’s head.

The phase difference $\phi L-\phi R$ between the left and right signals received by the microphone is then deduced by performing a subtraction between the two phase responses obtained $\phi L-\phi R$. The curve C1 representing this phase difference as a function of the frequency has a linear shape, as shown in FIG. 6.

The frequency bands A-C that are out-of-phase with this phase difference, i.e. the frequency bands for which the phase difference between the left and right signals received is equal to 180 degrees plus or minus 20 degrees and modulo 360 degrees, are then determined.

The coefficients of the filters 45.1 and 45.2 of the block 45 respectively applied to the left electric sound signal 2 and to the right electric sound signal 3, which are for example "all pass" type filters, are then parameterized so as to minimize the phase opposition effects in these frequency bands. These all-pass filters are for example IIR (Infinite Impulse Response) type filters.

Minimizing the phase oppositions between signal received from the left channel and the signal received from the right channel gives all of the passengers in the vehicle the impression that the transducers 21, 26 are positioned symmetrically relative to each of them, which increases the quality of their listening experience.

The phase response of the all-pass filter G1 shown in FIG. 6 goes from 0 to minus 360 degrees, passing through an inflection point (which corresponds to the cutoff frequency) for which the phase equals minus 180 degrees.

Applying to one of the electric signals 2, 3 all-pass filters whose cutoff frequency fc is equal to the middle frequency f1, f2 of the out-of-phase band in question introduces 180-degree phase delays at the points where the signals received are in phase opposition. This eliminates the frequency bands in which the left and right signals received are in phase opposition.

The curve C2 thus represents the phase difference when an all-pass filter of cutoff frequency f1 has been applied to one of the left or right electric sound signals, while the curve C3 represents the phase difference when all-pass filters, respectively of cutoff frequency f1 and f2, have been applied to one of the electric signals. It is noted that the curves C1-C3 are spaced apart from each other by a 360-degree angle.

In a variant, a combination of two all-pass filters G2, G3, respectively applied to the phase of the left electric sound signal 2 and the right electric sound signal 3, is used. The cutoff frequencies fc1, fc2 surround the middle frequency f1, f2 of the out-of-phase frequency band, as shown in FIG. 8*a*.

Figure 8A:
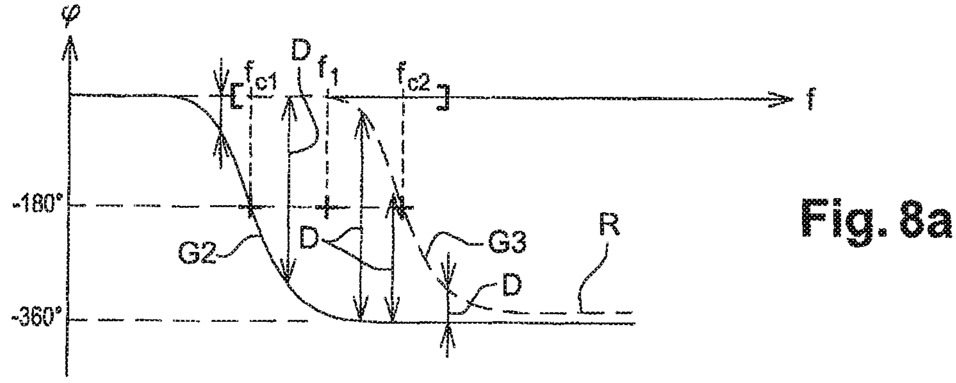
FIG. 8: graphical representations of the phase responses of two “all pass” filters and their combination, as well as the phase response of a Finite Impulse Response filter.
Figure 8B:
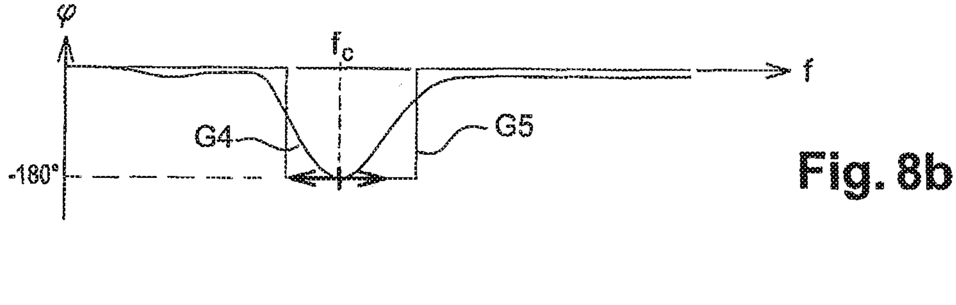

The combination of these filters G2 and G3 makes it possible to obtain a filter G4, shown in FIG. 8*b*, having a phase response that falls progressively from zero to a minimum of minus 180 degrees and then rises back to zero (the shape of an inverted Gauss curve), thus following the value of the phase difference D between the curves G2 and G3 of FIG. 8*a*.

Applying these pairs of filters thus allows the phase difference curve G4 (represented by a dotted line) to locally deviate from the frequency values f1, f2 for which the signals received are in phase opposition, then return to the curve C1. In other words, using these pairs of all-pass filters makes it possible to locally suppress the frequency bands A-C in phase opposition.

In practice, the out-of-phase frequency bands are corrected in the [20 Hz, 2000 Hz] range.

In a variant, FIR or Finite Impulse Response type filters G5 are used, making it possible to design the desired phase response, which phase response can have the curve of the combination of all-pass filters. Preferably, these filters each have a phase response having the curve of an inverted gate having a value of −180 degrees in a frequency band in which the left and right signals received are in phase opposition.

In practice, in order to develop such FIR filters, the frequency response desired in the frequency domain is first plotted, and an inverse Fourier transform is performed in order to obtain the impulse response of the filter in the time domain.

It is sufficient to perform the phase correction operation at the location of the head of one passenger, preferably the driver, in order for the effect associated with this correction to be perceived by all the passengers.

In essence, the vehicle is symmetrical between its left and right parts, so the perceived sound effect for the front passenger is the same as that perceived by the driver. Moreover, the vehicle is also symmetrical between its front and rear parts, so the sound effect associated with the phase correction of the left and right signals 2, 3 delivered in the rear is perceived equally by all of the rear passengers.

However, it would be possible to repeat the phase correction operation in the rear in order to adjust the settings of the method according to the invention.

Figure 5:
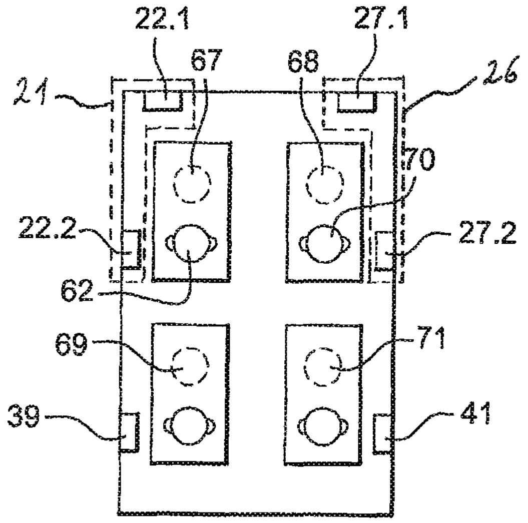

Thus, the phase equalization is such that when the signals 20, 34", 35" and 25 are delivered, the passenger perceives the center of the sound image 67, 68, 69, 71 to be in front of him, as shown in FIG. 5.

In the "all passengers" embodiment, the delays t1-t14 are introduced so as to time-align the "tweeter/woofer" pairs 22.1 and 22.2 as well as the pairs 27.1 and 27.2. Time-alignment means introducing a delay in the signal from the closest speaker so that the sound wave emitted by the latter is perceived at the same time as the sound wave emitted by the speaker whose signal is not delayed.

The delays t1 and t2, then t3 and t4, are therefore identical in pairs, i.e., the left and right delays applied to the tweeters 22.1, 27.1 are identical (t1=t2) and the left and right delays applied to the woofers 22.2, 27.2 are identical (t3=t4).

Figure 3:
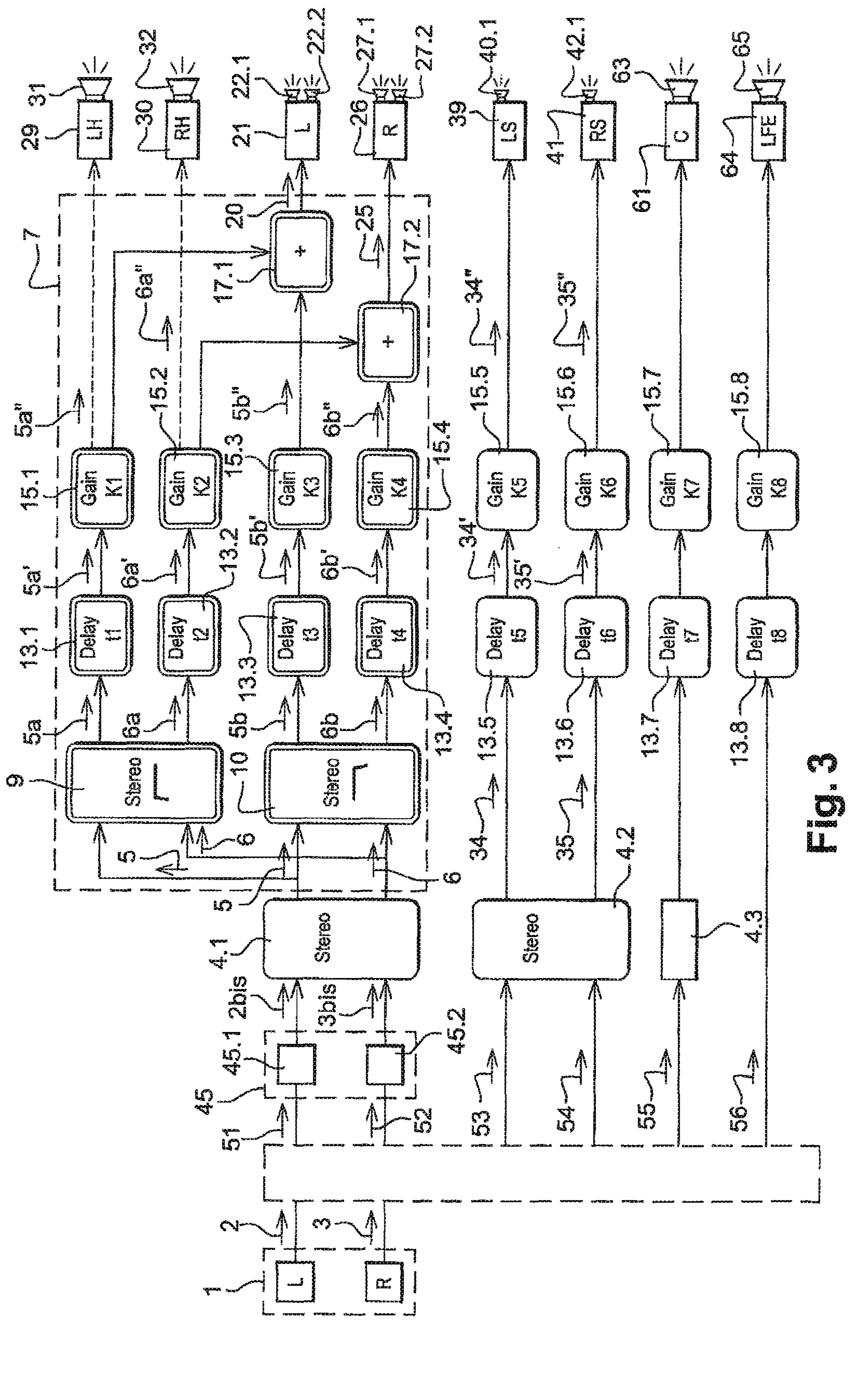
FIG. 3: a schematic functional representation of an audio system according to the invention with 2 input channels and 6 output channels.

FIG. 3 shows a variant wherein six input electric sound signals 51-55 are generated from two input electric sound signals 2 and 3. These signals are generated by implementing the sound processing method described in the patent published as number WO 2006/125931.

More precisely, a central electric sound signal 55 that includes only the substantially in-phase spectral components of the left 2 and right 3 electric sound signals is generated. This signal 55 is first corrected by the spectrum correction module 4.3.

Next, the signal obtained is delayed by the cell 13.7 by a delay t7, and volume-adjusted by the cell 15.7 in order to then be delivered by the transducer 61. This transducer 61 includes one or two speakers 63, depending on the vehicle model, and is preferably positioned in the center of the dashboard.

Furthermore, the front left electric sound signal 51 and the front right electric sound signal 52 are generated by subtracting the spectral components of the signal 55 from those of the left electric sound signal and from those of the right electric sound signal 3, respectively.

The signals 51, 52, 53 and 54 are then processed in "driver" mode or in "all passengers" mode as described in FIGS. 1 and 2.

Another electric sound signal 56 can be created from the low frequency filtering of the left and right electric sound signals 2 and 3. Like the others, this signal 56, can be delayed by a delay cell 13.8 and volume-adjusted by a cell 15.8 prior to being delivered by a transducer 64 comprising a low frequency speaker 65.

In a variant, a source such as a DVD player with 6 input signals (6 input channels) is already available.

In a variant, when there are 6 input channels available but only 2 or 4 output channels, the output channels correspond to a combination of the six available input channels.

It is noted that with the "all passengers" and "driver" modes, sound rendering using transducers 21, 26 and 39, 42 with one speaker is at least similar to sound rendering with no processing but with several speakers per transducer.

The use of the invention is particularly advantageous with entry level vehicles having only one speaker per transducer. In that case, the single speaker of the transducers 21 or 26 is preferably a wide band speaker.

The invention claimed is:

1. A method for sound processing of a stereophonic signal inside a motor vehicle, the stereophonic signal being composed of a left electric sound signal and a right electric sound signal, further comprising the steps of:

delivering the left electric sound signal and the right electric sound signal by front left and right transducers;

applying all-pass filters to the left or right electric sound signal, each all-pass filter having a cutoff frequency (fc) substantially equal to a middle frequency (f1, f2) of a frequency band for which the left and right electric sound signals received are in phase opposition;

recording a left channel signal emitted by the left transducer by a microphone at the location of a passenger's head;

determining a left phase response (ϕL) of the received left channel signal indicating the variation in the phase of the received left channel signal as a function of a frequency of the received left channel signal;

recording a right channel signal emitted by the right transducer by the microphone at the location of the passenger's head;

determining a right phase response (ϕR) of the received right channel signal indicating the variation in the phase of the received right channel signal as a function of a frequency of the received right channel signal, calculating a phase difference (ϕL−ϕR) between the left and right channel signals received by the microphone; and modifying the phases of the left electric sound signal and the right electric sound signal so as to minimize the phase oppositions between the left channel signal received from the left transducer and the right channel signal received from the right transducer at the location of the passenger's head.

2. The method of claim 1, further comprising the step of minimizing the phase opposition effects between the left channel signal received from the left transducer and the right channel signal received from the right transducer at the location of the heads of all the passengers in the vehicle.

3. The method of claim 2, further comprising the step of applying filters to at least one of the left electric sound signal or the right electric signal so that a phase difference curve (ϕL−ϕR) between the left and right electric sound signals received at the location of the passenger's head bypasses the points at which the left and right electric sound signals are in phase opposition, thereby minimizing the phase oppositions.

4. The method of claim 3, further comprising the step of applying Finite Impulse Response (FIR) type filters to at least one of the left electric sound signal or the right electric signal, each FIR type filters having a phase response having a curve of an inverted gate having a value of −180 degrees in a frequency band in which the signals received are in phase opposition.

5. The method of claim 3, further comprising the step of categorizing the left and right electric sound signals received to be in phase opposition when a phase difference between the left and right electric sound signals is equal to 180 degrees plus or minus 20 degrees modulo 360 degrees.

6. The method of claim 1, further comprising the step of applying pairs of all-pass filters to the left and right electric sound signals, one of the filters in the pair being applied to the left electric sound signal and the other filter in the pair being applied to the right electric sound signal, the filters in a pair having cutoff frequencies (fc1, fc2) that surround a middle frequency (f1) of a frequency band for which the left and right electric sound signals received are in phase opposition, thereby minimizing the phase opposition effects.

7. The method of claim 1, further comprising the step of applying Infinite Impulse Response (IIR) type filters to the left or right electric sound signal.

8. The method of claim 1, further comprising the step of minimizing the phase opposition effects for a frequency band of between 20 hz and 2 kHz.

9. The method of claim 1, further comprising the step of equalizing a frequency spectrum of the left and right electric sound signals by a spectrum correction module to compensate for acoustics in front of the vehicle.

10. The method of claim 1, further comprising the steps of filtering frequency bands of each electric sound signal, and introducing delays (t1-t4) in the frequency bands, and selecting the delays (t1-t4) to time-align speakers of the left transducer and speakers of the right transducer delivering the frequency bands.

11. The method of claim 10, further comprising the steps of filtering a low frequency part and a high frequency part of each electric sound signal, each transducer comprising a low frequency speaker and a high frequency speaker; selecting the delays (t1, t3) to time-align the speakers respectively delivering the low and high frequency parts of the left electric sound signal; and selecting the delays (t2, t4) to time-align the speakers respectively delivering the low and high frequency parts of the right electric sound signal.

12. The method of claim 11, further comprising the steps of applying the delays (t1, t2) to the high frequency speakers of the left and right transducers, respectively, are identical, and applying the delays (t3, t4) to the low frequency speakers of the left and right transducers, respectively, are identical.

13. The method of claim 10, further comprising the step of selecting the frequency bands of the speakers to correspond to the frequency bands of the filtered signals delivered by the speakers.

14. The method of claim 10, further comprising the steps of:

combining the frequency bands of the left electric sound signal into a reconstructed left electric sound signal, the reconstructed left electric sound signal being delivered by the left transducer; and combining the frequency bands of the right electric sound signal into a reconstructed right electric sound signal, the reconstructed right electric sound signal being delivered by the right transducer.

15. The method of claim 10, further comprising the step of volume adjusting the frequency bands of the electric sound signals by gain cells.

16. The method of claim 1, further comprising the steps of generating a central electric sound signal from in-phase spectral components of left and right electric sound signals originating from a stereophonic source, and delivering the central electric sound signal, after an introduction of a delay (t7) and an adjustment of the level and volume, by a transducer positioned in the center of a dashboard of the vehicle.

17. The method of claim 1, further comprising the steps of filtering frequency bands of each electric sound signal; introducing delays (t1-t4) introduced in the frequency bands; and selecting the delays (t1, t4) so that the transducers delivering these frequency bands are virtually disposed on a circle having as its center the place where a driver is located and having a radius (RHPmax) equal to a distance that separates the driver from the transducer furthest from the driver.

18. The method of claim 17, further comprising the steps of filtering a low frequency part and a high frequency part of each electric sound signal, each transducer comprising a low frequency speaker located in a front door of the vehicle and a high frequency speaker located in a dashboard of the vehicle; selecting the delays (t1, t3) to time-align the speakers respectively delivering the low and high frequency parts of the left electric sound signal; and selecting the delays (t2, t4) to time-align the speakers respectively delivering the low and high frequency parts of the right electric sound signal.

19. The method of claim 18, further comprising the steps of applying the delays (t1, t2) to the high frequency speakers of the left and right transducers, respectively, are identical, and applying the delays (t3, t4) to the low frequency speakers of the left and right transducers, respectively, are identical.

20. A motor vehicle comprising:

a sound source generating a stereo signal inside the motor vehicle, the stereo signal being composed of a left electric sound signal and a right electric sound signal;

a front left transducer comprising only one speaker;

a front right transducer comprising only one speaker; and an audio system to process the left and right electric sound signals by delivering the left electric sound signal and the right electric sound signal by the front left and right transducers;

applying all-pass filters to the left or right electric sound signal, each all-pass filter having a cutoff frequency (fc) substantially equal to a middle frequency (f1, f2) of a frequency band for which the left and right electric sound signals received are in phase opposition;

recording a left channel signal emitted by the front left transducer by a microphone at the location of a passenger's head;

determining a left phase response (ϕL) of the received left channel signal indicating the variation in the phase of the received left channel signal as a function of a frequency of the received left channel signal;

recording a right channel signal emitted by the front right transducer by the microphone at the location of the passenger's head;

determining a right phase response (ϕR) of the received right channel signal indicating the variation in the phase of the received right channel signal as a function of a frequency of the received right channel signal, calculating a phase difference (ϕL−ϕR) between the left and right channel signals received by the microphone; and modifying the phases of the left electric sound signal and the right electric sound signal so as to minimize the phase oppositions between the left channel signal received from the front left transducer and the right channel signal received from the front right transducer at the location of the passenger's head.

21. The motor vehicle of claim 20, wherein the speakers of the front left transducer and the front right transducer are wide-band speakers.

* * * * *